United States Patent [19]
Morman

[11] Patent Number: 5,114,781
[45] Date of Patent: *May 19, 1992

[54] MULTI-DIRECTION STRETCH COMPOSITE ELASTIC MATERIAL INCLUDING A REVERSIBLY NECKED MATERIAL

[75] Inventor: Michael T. Morman, Alpharetta, Ga.

[73] Assignee: Kimberly-Clark Corporation, Neenah, Wis.

[*] Notice: The portion of the term of this patent subsequent to Jan. 1, 2008 has been disclaimed.

[21] Appl. No.: 451,281

[22] Filed: Dec. 15, 1989

[51] Int. Cl.⁵ .................................. B32B 27/14
[52] U.S. Cl. .................................. 428/198; 428/152; 428/245; 428/253; 428/284; 428/286; 428/287; 428/297; 428/298; 428/903; 428/913
[58] Field of Search .............. 428/152, 196, 197, 198, 428/252, 253, 284, 286, 903, 245, 287, 297, 298, 903, 913

[56] References Cited

U.S. PATENT DOCUMENTS

| | | | |
|---|---|---|---|
| 1,741,530 | 12/1929 | Mayer | 156/229 |
| 2,004,110 | 6/1935 | Head | 154/40 |
| 2,574,200 | 11/1951 | Teague | 23/74 |
| 3,047,444 | 7/1962 | Harwood | 154/46 |
| 3,059,313 | 10/1962 | Harmon | 28/80 |
| 3,341,394 | 9/1967 | Kinney | 161/72 |
| 3,406,033 | 10/1968 | Reitz | 117/7 |
| 3,410,748 | 11/1968 | Blue | 161/76 |
| 3,438,844 | 4/1969 | Kumin | 161/150 |
| 3,485,695 | 12/1969 | Ness | 156/229 |
| 3,575,784 | 4/1971 | Phillips et al. | 161/150 |
| 3,772,417 | 11/1973 | Vogt | 264/230 |
| 3,932,682 | 1/1976 | Loft et al. | 428/296 |
| 3,949,128 | 4/1976 | Ostermeier | 428/152 |
| 4,013,816 | 3/1977 | Sabee et al. | 428/288 |
| 4,209,563 | 6/1980 | Sisson | 428/288 |
| 4,342,812 | 8/1982 | Selwood | 428/286 |
| 4,443,513 | 4/1984 | Meitner et al. | 422/195 |
| 4,486,485 | 12/1984 | Sookne | 428/198 |
| 4,551,378 | 11/1985 | Carey, Jr. | 428/198 |
| 4,606,964 | 8/1986 | Wideman | 428/152 |
| 4,652,487 | 3/1987 | Morman | 428/138 |
| 4,657,802 | 4/1987 | Morman | 428/152 |
| 4,668,566 | 5/1987 | Braun | 428/286 |
| 4,677,695 | 7/1987 | Van Gompel et al. | 2/79 |
| 4,692,368 | 9/1987 | Taylor et al. | 428/137 |
| 4,720,415 | 1/1988 | Vander Wielen et al. | 428/152 |
| 4,789,699 | 12/1988 | Kieffer et al. | 524/271 |
| 4,981,747 | 1/1991 | Morman | 428/198 |

FOREIGN PATENT DOCUMENTS

| | | |
|---|---|---|
| 0019295 | 11/1980 | European Pat. Off. |
| 0030418 | 6/1981 | European Pat. Off. |
| 0127483 | 12/1984 | European Pat. Off. |
| 0180703 | 5/1986 | European Pat. Off. |
| 184932 | 6/1986 | European Pat. Off. |
| 0236091 | 9/1987 | European Pat. Off. |
| 0237642 | 9/1987 | European Pat. Off. |
| 2632875 | 11/1977 | Fed. Rep. of Germany |
| 2757526 | 6/1979 | Fed. Rep. of Germany |
| 648644 | 1/1951 | United Kingdom |
| 1532467 | 11/1978 | United Kingdom |
| 1576436 | 10/1980 | United Kingdom |

*Primary Examiner*—James J. Bell
*Attorney, Agent, or Firm*—Karl V. Sidor

[57] ABSTRACT

The present invention provides a composite elastic material adapted to stretch in at least two directions and which includes at least one reversibly necked material. The composite elastic material is disclosed as having at least one elastic sheet and at least one reversibly necked material joined to the elastic sheet at least at three locations arranged in a nonlinear configuration, so that the reversibly necked material is gathered between those locations. Also disclosed is a method of producing such a composite elastic material.

26 Claims, 7 Drawing Sheets

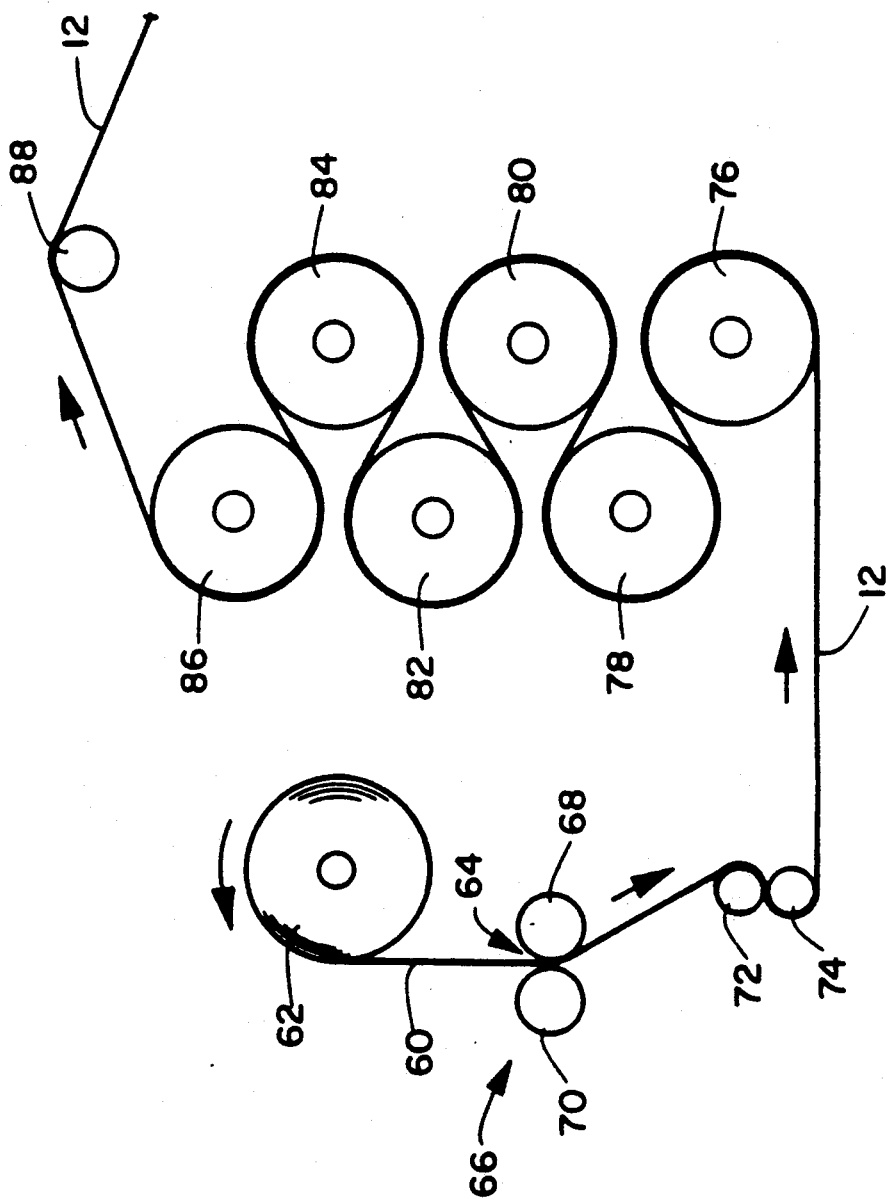

A>B

MULTI-DIRECTION STRETCH COMPOSITE ELASTIC MATERIAL INCLUDING A REVERSIBLY NECKED MATERIAL

FIELD OF THE INVENTION

The present invention relates to elasticized materials and a method of making the same. Generally speaking, the present invention relates to a composite elastic material including at least one elastic sheet.

BACKGROUND OF THE INVENTION

Plastic nonwoven webs formed by nonwoven extrusion processes such as, for example, meltblowing processes and spunbonding processes may be manufactured into products and components of products so inexpensively that the products could be viewed as disposable after only one or a few uses. Representatives of such products include diapers, tissues, wipes, garments, mattress pads and feminine care products.

Some of the problems in this area are the provision of an elastic material which is resilient and flexible while still having a pleasing feel. One problem is the provision of an elastic material which does not feel plastic or rubbery. The properties of the elastic materials can be improved by forming a laminate of an elastic material with one or more nonelastic material on the outer surface which provide better tactile properties.

Nonwoven webs formed from nonelastic polymers such as, for example, polypropylene are generally considered nonelastic. The lack of elasticity usually restricts these nonwoven web materials to applications where elasticity is not required or desirable.

Composites of elastic and nonelastic materials have been made by bonding nonelastic materials to elastic materials in a manner that allows the entire composite material to stretch or elongate, typically in one direction, so they can be used in garment materials, pads, diapers and personal care products.

In one such composite material, a nonelastic material is joined to an elastic sheet while the elastic sheet is in a stretched condition so that when the elastic sheet is relaxed, the nonelastic material gathers between the locations where it is bonded to the elastic sheet. The resulting composite elastic material is stretchable to the extent that the nonelastic material gathered between the bond locations allows the elastic sheet to elongate. An example of this type of composite material is disclosed, for example, by U.S. Pat. No. 4,720,415 to Vander Wielen et al., issued Jan. 19, 1988.

Another elastic sheet could be used in place of the nonelastic gatherable material in the composite of Vander Wielen et al. so that the resulting composite material may be capable of stretching in more than one direction. However, a composite formed solely from elastic sheets would have the undesirable plastic or rubbery feel which was intended to be eliminated by producing composite materials.

DEFINITIONS

The term "elastic" is used herein to mean any material which, upon application of a biasing force, is stretchable, that is, elongatable, at least about 60 percent (i.e., to a stretched, biased length which is at least about 160 percent of its relaxed unbiased length), and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length — final sample length)/(maximum stretch length — initial sample length)] × 100.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "microfibers" means small diameter fibers having an average diameter not greater than about 100 microns, for example, having an average diameter of from about 0.5 microns to about 50 microns, more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spunbonded nonwoven webs is illustrated in patents such as, for example, in U.S. Pat. No. 4,340,563 to Appel et al., and U.S. Pat. No.

3,692,618 to Dorschner et al. The disclosures of both these patents are hereby incorporated by reference.

As used herein, the term "interfiber bonding" means bonding produced by entanglement between individual fibers to form a coherent web structure without the use of thermal bonding. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of a fibrous web. For example, powdered bonding agents and chemical solvent bonding may be used.

As used herein, the term "sheet" means a layer which may either be a film or a nonwoven web.

As used herein, the term "necked material" refers to any material which has been constricted in at least one dimension by applying a tensioning force in a direction that is perpendicular to the desired direction of neckdown. Processes that may be used to constrict a material in such a manner include, for example, drawing processes.

As used herein, the term "neckable material" means any material which can be necked.

As used herein, the term "reversibly necked material" refers to a material formed from a material that has been treated while necked to impart memory to the material so that, when a force is applied to extend the material to its pre-necked dimensions, the treated, necked portions will generally recover to their necked dimensions upon termination of the force. One form of treatment is the application of heat. Generally speaking, extension of the reversibly necked material is limited to extension to its pre-necked dimensions. Therefore, unless the material is elastic, extension too far beyond its pre-necked dimensions will result in material failure. A reversibly necked material may include more than one layer. For example, multiple layers of spunbonded web, multiple layers of meltblown web, multiple layers of bonded carded web or any other suitable material or mixtures thereof.

As used herein, the term "percent neckdown" refers to the ratio determined by measuring the difference between the un-necked dimension and the necked dimension of the neckable material and then dividing that difference by the un-necked dimension of the neckable material As used herein, the term "composite elastic material" refers to a multilayer material adapted to stretch and recover in at least two directions and which has at least one elastic layer joined to a reversibly necked material at least at three locations arranged in a nonlinear configuration wherein the reversibly necked material is gathered between at least two of those locations The composite elastic material of the present invention has stretch and recovery in at least one direction, for example, the machine direction, to the extent that the gathers in the reversibly necked material allow the elastic material to elongate. The composite elastic material also has stretch and recovery in at least one other direction, for example, in a direction generally parallel to the neckdown of the reversibly necked material (e.g., typically in the cross-machine direction). The composite elastic material may be stretched in that direction to about the reversibly necked material's pre-necked width. The composite elastic material is adapted to recover to about its initial width (i.e., the reversibly necked material's necked width).

The terms "elongation" or "percent elongation" as used herein refers to a ratio determined by measuring the difference between an elastic material's extended and unextended length in a particular dimension and dividing that difference by the elastic material's unextended length in that same dimension.

As used herein, the term "superabsorbent" refers to absorbent materials capable of absorbing at least 5 grams of aqueous liquid per gram of absorbent material (e.g., greater than 20 grams of distilled water per gram of absorbent material) while immersed in the liquid for 4 hours and holding substantially all of the absorbed liquid while under a compression force of up to about 1.5 psi.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

The present invention provides a method of producing a composite elastic material adapted to stretch in at least two directions and having one or more layers of reversibly necked material joined to one or more layers of elastic sheet at least at two locations wherein the reversibly necked material is gathered between the locations.

The composite elastic material adapted to stretch in at least two directions may be formed by elongating an elastic sheet, joining a reversibly necked material to the elongated elastic sheet at least at three locations arranged in a nonlinear configuration, and relaxing the elongated elastic sheet so that the reversibly necked material is gathered between the at least two of the locations.

- The reversibly necked material may be joined to the elongated elastic sheet by overlaying the materials and applying heat and/or pressure to the overlaid materials. Alternatively, the layers may by joined by using other bonding methods and materials such as, for example, adhesives, pressure sensitive adhesives, ultrasonic welding, hydraulic entangling high energy electron beams, and/or lasers.

The resulting composite elastic material has stretch and recovery in at least one direction, for example, the machine direction, to the extent that the gathers in the reversibly necked material allow the elastic material to elongate. The composite elastic material also has stretch and recovery in at least one other direction, for example, in a direction generally parallel to the neckdown of the reversibly necked material. The neckdown of the reversibly necked material may be in the cross-machine direction and the composite elastic material may be stretched in that direction typically to about the reversibly necked material's initial width. The composite elastic material is adapted to recover to about its initial width (i.e., the necked material's necked width).

The elastic sheet used as a component of the composite elastic material may be a pressure sensitive elastomer adhesive sheet. If the elastic sheet is a nonwoven web of elastic fibers or pressure sensitive elastomer adhesive fibers, the fibers may be meltblown fibers. The meltblown fibers may include meltblown microfibers.

The reversibly necked material used as a component of the composite elastic material is formed from a neckable material. The neckable material is necked by drawing in a direction generally perpendicular to the desired direction of neck-down. Memory may be imparted to certain necked materials so that, when a force is applied to extend the necked materials to their pre-necked dimensions, the materials return generally to their necked dimensions upon termination of the force. Such memory may be imparted to necked materials by heating the necked materials and cooling the materials while they are still in the necked configuration.

According to the present invention, the reversibly necked material may be made from any neckable material that can be treated to acquire such memory characteristics. Such neckable materials may be in the form of, for example, bonded carded webs, spunbonded webs or meltblown webs. The meltblown web may include meltblown microfibers. The reversibly necked material may also include multiple layers such as, for example, multiple spunbond layers and/or multiple meltblown layers. The reversibly necked material may be made of polymers such as, for example, polyolefins. Exemplary polyolefins include polyethylene, polypropylene, polybutylene, polyethylene copolymers, polypropylene copolymers, polybutylene copolymers and combinations of the above.

BRIEF DESCRIPTION OF THE DRAWINGS

FIG. 2 is a schematic representation of an exemplary process for forming a reversibly necked material component of a composite elastic material.

DETAILED DESCRIPTION OF THE INVENTION

Figure 1:
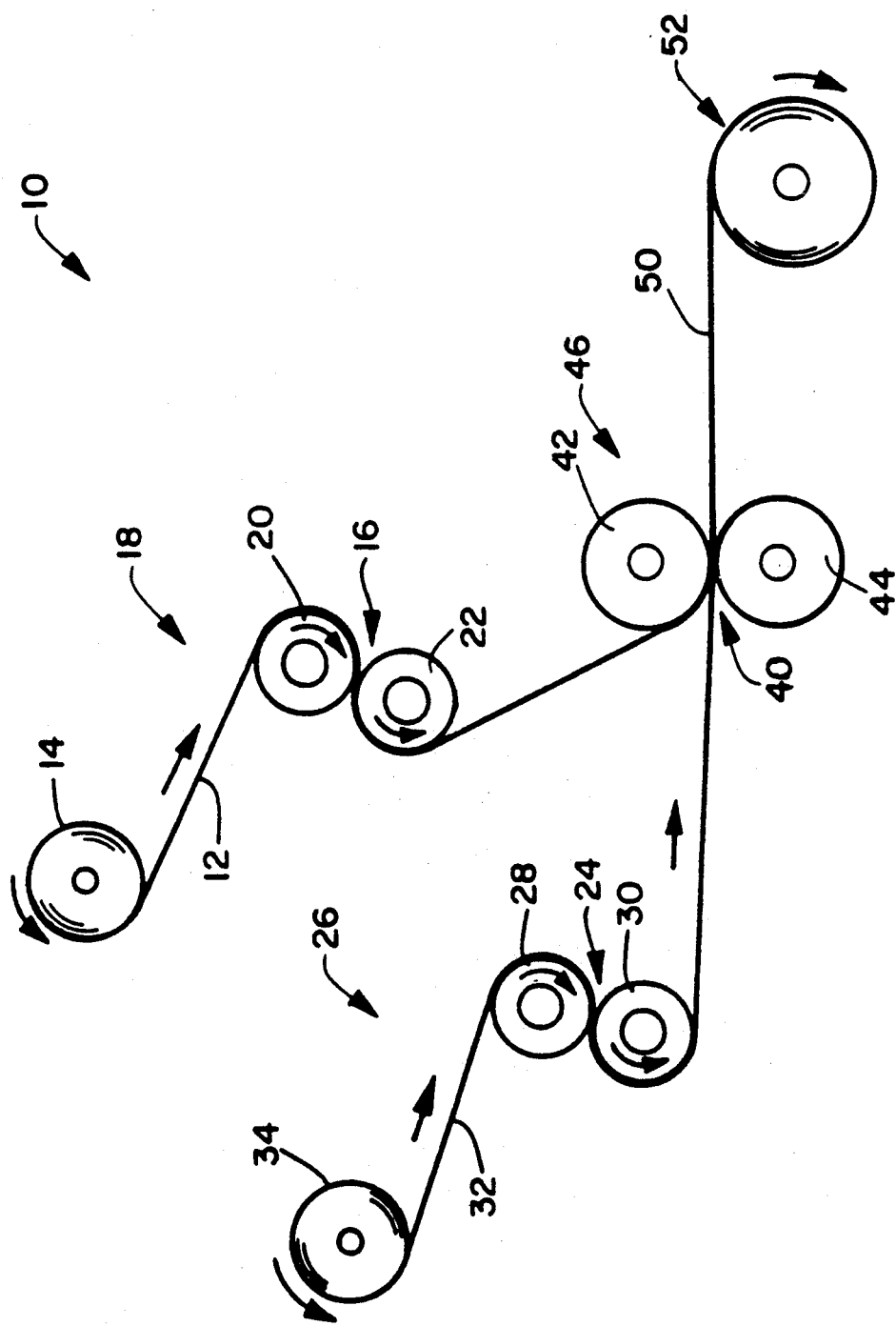
FIG. 1 is a schematic representation of an exemplary process for forming a composite elastic material.

Referring to FIG. 1 of the drawings there is schematically illustrated at 10 a process for forming a composite elastic material capable of stretching in at least two directions.

According to the present invention, a reversibly necked material 12 is unwound from a supply roll 14 and travels in the direction indicated by the arrow associated therewith as the supply roll 14 rotates in the direction of the arrows associated therewith. The reversibly necked material 12 passes through a nip 16 of a first S-roll arrangement 18 formed by the stack rollers 20 and 22.

The reversibly necked material 12 may be formed by known nonwoven extrusion processes, such as, for example, known meltblowing processes or known spunbonding processes, and passed directly through the nip 16 without first being stored on a supply roll.

An elastic sheet 32 is unwound from a supply roll 34 and travels in the direction indicated by the arrow associated therewith as the supply roll 34 rotates in the direction of the arrows associated therewith. The elastic sheet passes through the nip 24 of a second S-roll arrangement 26 formed by the stack rollers 28 and 30. The elastic sheet 32 may be formed by extrusion processes such as, for example, meltblowing processes or film extrusion processes and passed directly through the nip 24 without first being stored on a supply roll.

The reversibly necked material 12 passes through the nip 16 of the first S-roll arrangement 18 in a reverse-S path as indicated by the rotation direction arrows associated with the stack rollers 20 and 22. From the first S-roll arrangement 18, the reversibly necked material 12 passes through the pressure nip 40 formed by the bonder rollers 42 and 44 of a bonder roller arrangement 46. At the same time, the elastic sheet 32 also passes through the nip 24 of the second S-roll arrangement 26 in a reverse-S path as indicated by the rotation direction arrows associated with the stack rollers 28 and 30. From the second S-roll arrangement 26, the elastic sheet 32 passes through the pressure nip 40 formed by the bonder rollers 42 and 44 of a bonder roller arrangement 46.

The reversibly necked material 12 may be tensioned between the S-roll arrangement 18 and the pressure nip of the bonder roll arrangement 46 by controlling the peripheral linear speed of the rollers of the first S-roll arrangement 18 to be less than the peripheral linear speed of the bonder rollers 42 and 44 of the bonder roller arrangement 46. Since the reversibly necked material 12 maintains its necked dimensions even without a necking force, there is no need to maintain large amounts of tension upon the reversibly necked material 12 in order to keep it in a necked condition. The only tension required is tension to maintain control of the reversibly necked material The peripheral linear speed of the rollers of the second S-roll arrangement 26 is controlled to be less than the peripheral linear speed of the bonder rollers of the bonder roller arrangement 46 so that the elastic sheet 32 is tensioned and elongated between the second S-roll arrangement 26 and the pressure nip 40 of the bonder roll arrangement 46.

By adjusting the difference in the speeds of the rollers, the elastic sheet 32 is tensioned so that it maintains its elongated condition while the reversibly necked material 12 is joined to the elongated elastic sheet 32 during their passage through the bonder roller arrangement 46 to form a composite elastic laminate 50 which passes to a wind-up roll 52 which is rotating at a peripheral liner speed that is about the same or less than the peripheral linear speed of bonder rollers 42 and 44. Alternatively, the composite elastic laminate 50 may pass to a holding box (not shown) to allow the elongated elastic sheet 32 to retract and gather the necked material 12.

Conventional drive means and other conventional devices which may be utilized in conjunction with the apparatus of FIG. 1 are well known and, for purposes of clarity, have not been illustrated in the schematic view of FIG. 1.

If the bonder rollers 42 and 44 are heated bonded rollers which thermally bond the necked material 12 and the elongated elastic sheet 32, then upon emerging from the pressure nip 40 of the bonder roller arrangement 46, it may be desirable for the composite elastic material 50 to immediately pass to a holding box where the composite elastic material 50 is maintained in a relaxed unstretched condition for a length of time sufficient for the elastic sheet to cool sufficiently to avoid its cooling while it is in a stretched condition and thereby lose all or some of its ability to contract from the stretched dimensions which it had assumed during bonding. It has been found that elastic sheets, particularly low basis weight elastic sheets, may loose their ability to contract to or return to their original unstretched dimensions if they are maintained under tension at or above their softening temperature for any significant length of time. A brief recovery period in a relaxed, untensioned condition immediately after bonding has been found to be desirable to allow the low basis weight elastic sheet to contract and gather the necked material so the bonded web attains its elasticity in that direction to the extent that the necked material which is gathered between the bond locations allows the elastic sheet to elongate.

FIG. 2 illustrates an exemplary process of making the reversibly necked material component 12 of a composite elastic material 50. A neckable material 60 is unwound from a supply roll 62 and travels in the direction indicated by the arrow associated therewith as the supply roll 62 rotates in the direction of the arrows associated therewith. The neckable material 60 passes through the nip 64 of a drive roller arrangement 66 formed by the drive rollers 68 and 70 and then past the idler rolls 72 and 74.

The neckable material 60 may be formed by known nonwoven extrusion processes, such as, for example, known meltblowing processes or known spunbonding processes, and passed directly through the nip 64 without first being stored on a supply roll.

After passing through the nip 64 of the driver roller arrangement 66 and the idler rollers 72 and 74, the neckable material 60 passes over a series of steam cans 76-86 in a series of reverse S loops as indicated by the rotation direction arrows associated with the steam cans. The steam cans 76-86 typically have an outside diameter of about 24 inches although other sized cans may be used. The contact time or residence time of the neckable material on the steam cans to effect heat treatment will vary depending on factors such as, for example, steam can temperature, type of material and the basis weight of the material. For example, a necked web of spunbond polypropylene may be passed over a series of steam cans heated to a measured temperature from about 90° to about 150° C. (194°–302° F.) for a contact time of 5 to about 300 seconds to effect heat treatment. More particularly, the temperature may range from about 125° to about 143° C. and the residence time may range from about 2 to about 50 seconds.

Because the peripheral linear speed of the drive rollers 68 and 70 of the drive roller arrangement 66 is controlled to be lower than the peripheral linear speed of the steam cans 76-86, the neckable material 60 is tensioned between the steam cans 76-86 and the nip 64 of the drive roller arrangement 66. By adjusting the difference in the speeds of the rollers, the neckable material 60 is tensioned so that it necks a desired amount and is maintained in the necked condition while passing over the heated steam cans 76-86. This action imparts memory to the neckable material 60 of its necked condition. The neckable material 60 is then cooled in the necked condition as it passes the idler roller 88 to form the reversibly necked material 12. That is, a material which is adapted to stretch to at least its original, pre-necked dimensions upon application of a stretching force in a direction generally parallel to the direction of necking and then recover to about its reversibly necked dimensions upon release of the stretching force.

The neckable material 60 may be a nonwoven material such as, for example, spunbonded web, meltblown web or bonded carded web. If the neckable material 60 is a web of meltblown fibers, it may include meltblown microfibers. The neckable material 60 is made from any material that can be treated while necked so that, upon application of a force to extend the necked material to its pre-necked dimensions, the material returns generally to its necked dimensions upon termination of the force. Certain polymers such as, for example, polyolefins, polyesters and polyamides may be heat treated by, for example, heat, under suitable conditions to impart such memory. Exemplary polyolefins include one or more of polyethylene, polypropylene, polybutylene, poly(methyl pentene), polyethylene copolymers, polypropylene copolymers, and polybutylene copolymers. Polypropylenes that have been found useful include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09.

In one embodiment of the present invention, the neckable material 32 is a multilayer material having, for example, at least one layer of spunbonded web joined to at least one layer of meltblown web, bonded carded web or other suitable material. For example, neckable material 60 may be a multilayer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy. Alternatively, the neckable material 60 may be single layer of material such as, for example, a spunbonded web having a basis weight of from about 0.2 to about 10 osy or a meltblown web having a basis weight of from about 0.2 to about 8.0 osy.

The neckable material 60 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbents occurs prior to collection of the meltblown fibers upon a collecting device to form a coherent web of randomly dispersed meltblown fibers and other materials such as disclosed in previously referenced U.S. Pat. No. 4,100,324.

If the neckable material 60 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally, thermal bonding or a bonding agent may be used to increase the desired coherence of the web structure.

Although the present invention should not be held to a particular theory of operation, the heat treatment should raise the neckable material 60 to a temperature range for a specified time period where it is believed that additional polymer crystallization occurs while the material is in the necked condition. Because certain types of fibers are formed by methods such as, for example, meltblowing and spunbonding which cool the fibers very quickly, it is believed that the polymers forming the fibers are not highly crystallized. That is, the polymers harden before the crystallization is complete. It is believed that additional crystallization can be effected by increasing the temperature of the material to a temperature below the material's melting point. When this additional crystallization occurs while the material is in the necked condition, it is believed that memory of the necked condition is imparted to the material.

Figure 3A:
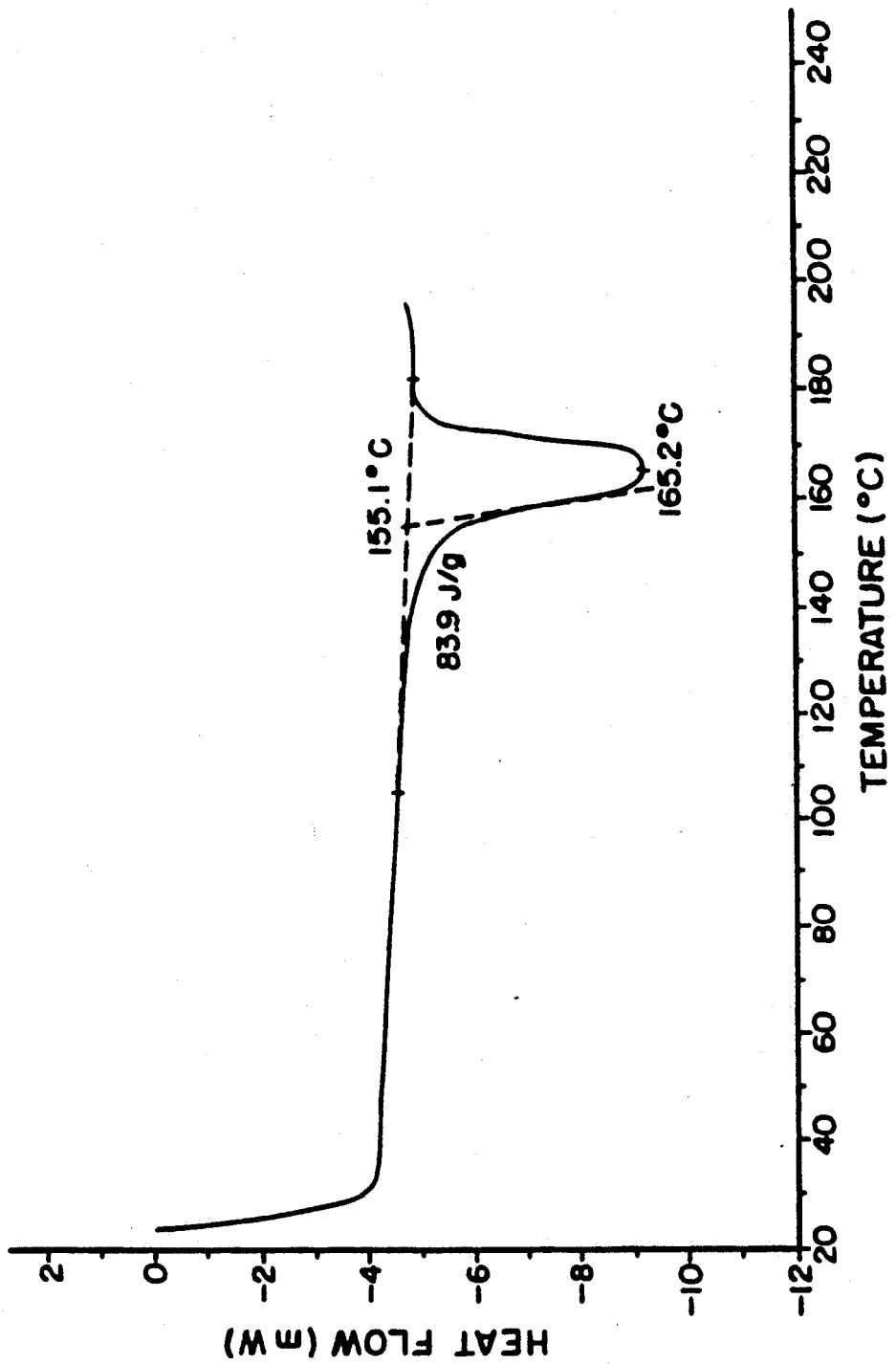
FIG. 3A is an exemplary Differential Scanning Calorimetry scan of a neckable material before heat treatment.
Figure 3B:
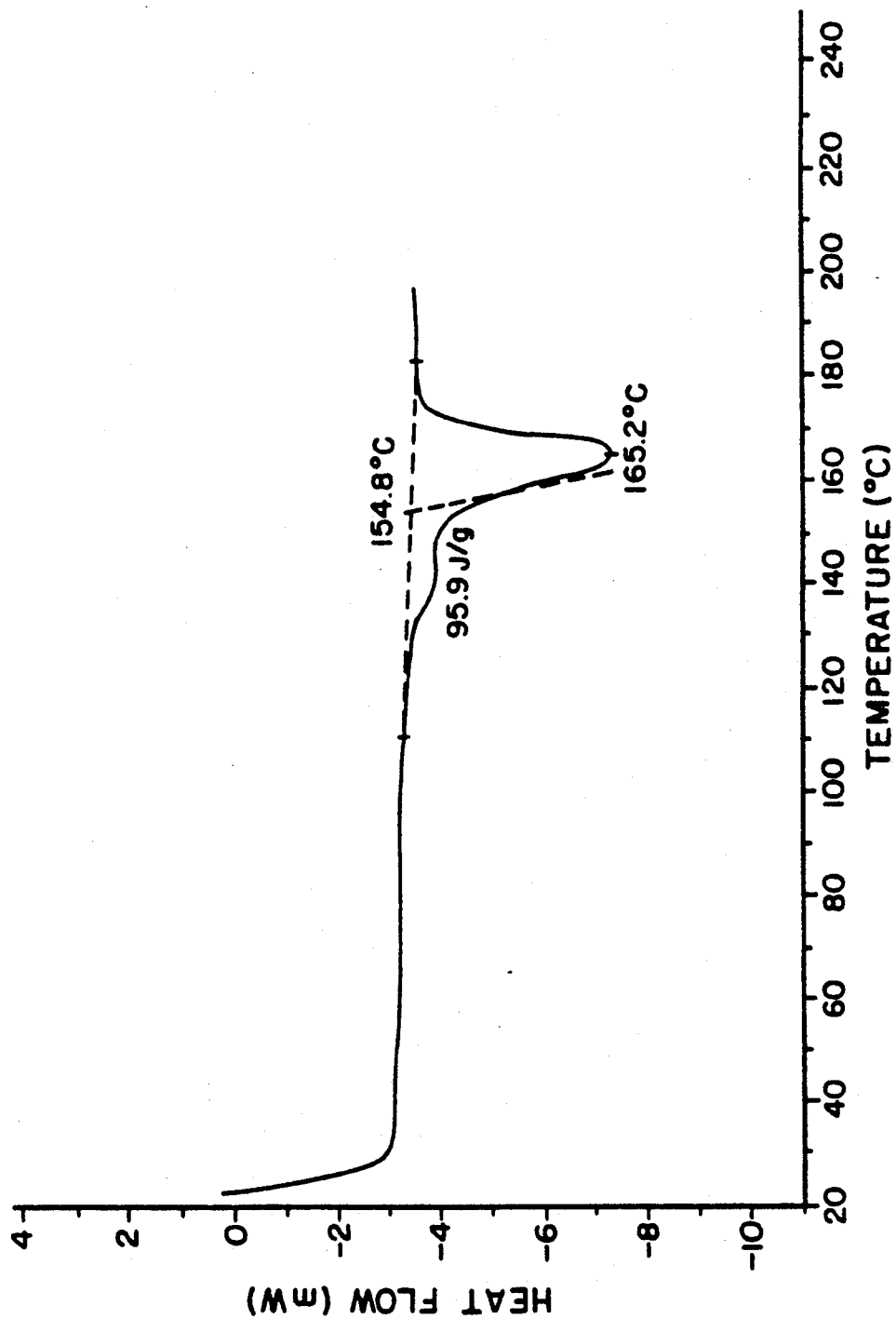
FIG. 3B is an exemplary Differential Scanning Calorimetry scan of a reversibly necked material, i.e., after treatment while necked.

FIG. 3A is an exemplary Differential Scanning Calorimetry scan of a spunbonded polypropylene material by a Model 1090 Thermal Analyzer available from Du Pont Instruments. FIG. 3B is an exemplary Differential Scanning Calorimetry scan of the same type of spunbonded polypropylene material which has been necked and heat treated. Differential Scanning Calorimetry can be used to show that neckable materials such as, for example, spunbonded webs, which have been necked and heat treated exhibit greater heats of fusion than the same materials which have not been heat treated. That is, the heat of fusion of a reversibly necked material is typically at least about 5 percent greater than the material before being reversibly necked. For example, from about 5 to about 15 percent greater.

Additionally, the onset of melting occurs at lower temperatures for necked and heat treated materials than for their non-heat treated counterparts. That is, the onset of melting of a reversibly necked material typically occurs at a temperature at least about 5° C. lower than for the material before being reversibly necked. For example, at a temperature from about 5° to about 15° C. lower. A greater heat of fusion is believed to result from additional crystallization which occurs during heat treatment. A lower temperature for onset of melting is believed to result from imperfect or strained crystals formed during heat treatment of the material while in the necked condition.

Figure 4:
FIG. 4 is an enlarged photomicrograph of an exemplary reversibly necked material used as a component of a composite elastic material.
Figure 5:
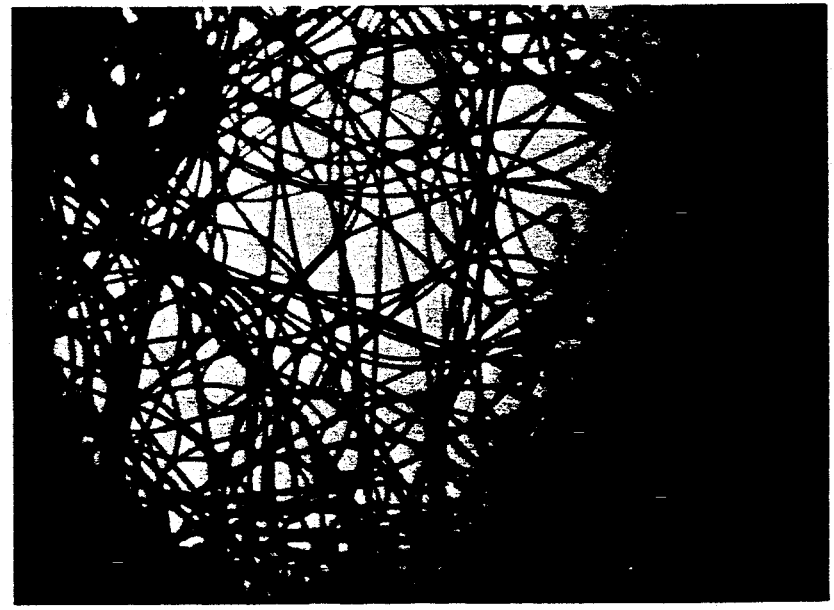
FIG. 5 is an enlarged photomicrograph of an exemplary neckable material.

Tensioning and heat treatment of nonelastic, neckable material 60 also adds crimps and kinks to the material as shown in FIG. 4, particularly when compared to the untreated material shown in FIG. 5. These crimps and kinks are believed to add to the stretch and recovery properties of the material. Reversibly necked materials and processes to make them are disclosed in, for example, U.S Pat. No. 4,965,122, titled "Reversibly Necked materials" filed on Sept. 23, 1988, by M. T. Morman, incorporated herein by reference.

The elastic sheet 32 may be made from any material which may be manufactured in sheet form. Generally, any suitable elastomeric fiber forming resins or blends containing the same may be utilized for the elastomeric fibers, threads, filaments and/or strands or the nonwoven webs of elastomeric fibers, threads, filaments and/or strands of the invention and any suitable elastomeric film forming resins or blends containing the same may be utilized for the elastomeric films of the invention. Useful elastic sheets may have basis weights ranging from about 5 gsm (grams per square meter) to about 300 gsm, for example, from about 5 gsm to about 150 gsm.

For example, the elastic sheet 32 may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 32 may be formed from, for example, (polystyrene/poly(ethylene-butylene)/polystyrene) block copolymers available from the Shell Chemical Company under the trademark KRATON G. One such block copolymer may be, for example, KRATON G-1657.

Other exemplary elastomeric materials which may be used to form elastic sheet 32 include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, U.S. Pat. No. 4,741,949 to Morman et al., hereby incorporated by reference. Elastic sheet 32 may also be formed from elastic copolymers of ethylene and at least one vinyl monomer such as, for example, vinyl acetates, unsaturated aliphatic monocarboxylic acids, and esters of such monocarboxylic acids. The elastic copolymers and formation of elastic sheets from those elastic copolymers are disclosed in, for example, U.S. Pat. No. 4,803,117.

Processing aids may be added to the elastomeric polymer. For example, a polyolefin may be blended with the elastomeric polymer (e.g., the A-B-A elastomeric block copolymer) to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutylene, including polyethylene copolymers, polypropylene copolymers and polybutylene copolymers. A particularly useful polyethylene may be obtained from the U.S.I. Chemical Company under the trade designation Petrothaene NA 601 (also referred to herein as PE NA 601 or polyethylene NA 601). Two or more of the polyolefins may be utilized. Extrudable blends of elastomeric polymers and polyolefins are disclosed in, for example, U.S. Pat. No. 4,663,220 to Wisneski et al., hereby incorporated by reference.

The elastic sheet 32 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, reversibly necked nonelastic web. In regard to the tackifying resins and tackified extrudable elastomeric compositions, note the resins and compositions as disclosed in U.S. Pat. No. 4,787,699, hereby incorporated by reference.

Any tackifier resin can be used which is compatible with the elastomeric polymer and can withstand the high processing (e.g., extrusion) temperatures. If the elastomeric polymer (e.g., A-B-A elastomeric block copolymer) is blended with processing aids such as, for example, polyolefins or extending oils, the tackifier resin should also be compatible with those blending materials. Generally, hydrogenated hydrocarbon resins are preferred tackifying resins, because of their better temperature stability. REGALREZ TM and ARKON TM P series tackifiers are examples of hydrogenated hydrocarbon resins. ZONATAK TM 501 lite is an example of a terpene hydrocarbon. REGALREZ TM hydrocarbon resins are available from Hercules Incorporated. ARKON TM P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON TM G-1657, about 17 to about 23 percent polyethylene NA 601, and about 15 to about 20 percent REGALREZ TM 1126.

The elastic sheet 32 may also be a multilayer material in that it may include two or more individual coherent webs or films. Additionally, the elastic sheet 32 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such an elastic composite web would be one made by a technique such as disclosed in previously referenced U.S. Pat. No. 4,741,949. That patent discloses an elastic nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, hydrocolloid (hydrogel) particulates commonly referred to as superabsorbents occurs prior to collection of the fibers upon a collecting device to form a coherent web of randomly dispersed fibers.

Referring again to FIG. 1, the bonder roller arrangement 46 may be a patterned calendar roller such as, for example, a pin embossing roller arranged with a smooth anvil roller. One or both of the calendar roller and the smooth anvil roller may be heated and the pressure between these two rollers may be adjusted by well-known means to provide the desired temperature, if any, and bonding pressure to join the reversibly necked material 12 to the elastic sheet 32 forming a composite elastic material 50.

Reversibly necked materials may be joined to the elastic sheet 32 at least at two places by any suitable means such as, for example, thermal bonding or ultrasonic welding. Thermal and/or ultrasonic joining techniques are believed to soften at least portions of at least one of the materials, usually the elastic sheet because the elastomeric materials used for forming the elastic sheet 32 have a lower softening point than the components of the reversibly necked material 12. Joining may be produced by applying heat and/or pressure to the overlaid elastic sheet 32 and the reversibly necked material 12 by heating these portions (or the overlaid layer) to at least the softening temperature of the material with the lowest softening temperature to form a reasonably strong and permanent bond between the re-solidified softened portions of the elastic sheet 32 and the reversibly necked material 12.

The reversibly necked materials should be joined to the tensioned elastic sheet at least at three locations which are arranged so that upon release of the tensioning force on the elastic sheet, puckers or gathers form in the reversibly necked material between at least two of the locations. Additionally, the three locations should be arranged so that when the composite elastic material is stretched in a direction substantially parallel to the direction of neckdown (i.e., in a direction substantially perpendicular to the tensioning force applied to the neckable material during the necking process), the recovery of the elastic sheet assists in the recovery of the reversibly necked material to substantially its necked dimensions. The three or more locations should be arranged in a nonlinear configuration to form for example, a triangular or polygonal pattern of locations where the reversibly necked material is joined to the elastic sheet.

With regard to thermal bonding, one skilled in the art will appreciate that the temperature to which the materials, or at least the bond sites thereof, are heated for heat-bonding will depend not only on the temperature of the heated roll(s) or other heat sources but on the residence time of the materials on the heated surfaces, the compositions of the materials, the basis weights of the materials and their specific heats and thermal conductivities. However, for a given combination of materials, and in view of the herein contained disclosure the processing conditions necessary to achieve satisfactory bonding can be readily determined.

Alternatively, the reversibly necked material 12 and the elastic sheet 32 may by joined by using other bonding methods and materials such as, for example, adhesives, pressure sensitive adhesives, solvent welding, hydraulic entangling, high energy electron beams, and/or lasers.

Because the tensioned elastic sheet 32 is bonded to the reversibly necked material 12, and the reversibly necked material is extendable in only one direction, the necked material tends to have a limiting effect on the degree of stretch of the elastic composite material in the direction that the reversibly necked material cannot be extended, typically the machine direction. To the extent that the reversibly necked material exhibits some resistance to being gathered, the elastic sheet will be unable to fully recover to its unstretched dimension once it is joined to the reversibly necked material. This requires that the distance that the elastic sheet is capable of stretching when it is joined to the reversibly necked material be greater than the desired stretch of the elastic composite material in the direction that the necked material cannot be easily extended (e.g., the machine direction). For example, if it is desired to prepare an elastic composite material that can be elongated about 100 percent in the machine direction (i.e., stretched to a length that is about 200 percent of its initial relaxed length), it may be necessary to stretch a 100 cm length of elastic web in the machine direction to a length of, for example, 220 cm (120 percent elongation) and bond the stretched elastic web at least at three locations (arranged in spaced-apart non-linear configuration) to a 220 cm length of reversibly necked material. The bonded composite elastic material is then allowed to relax and even if the elastic sheet is capable of recovering to its original 100 cm length, the reversibly necked material bonded thereto will inhibit full recovery and the composite may relax to a length of say, 110 cm. Puckers or gathers will form in the reversibly necked material between at least two of the bond points. The resulting 110 cm length of composite material is stretchable in the machine direction to its 220 cm length to provide a composite material that can be elongated about 100 percent in the machine direction (i.e., stretched to a length that is about 200 percent of its initial relaxed length). The initial length of the reversibly necked material limits, in this hypothetical example, the attainable machine direction elongation of the composite material because the reversibly necked material would act as a "stop" to prevent further or excessive stretching of the elastic sheet in the machine direction under the effect of stretching forces which are less than the failure strength of the reversibly necked, gathered material.

The relation between the original dimensions of the reversibly necked material 12 to its dimensions after neckdown determines the approximate limits of stretch of the composite elastic material in the direction of neckdown, typically the cross-machine direction.

Figure 6:
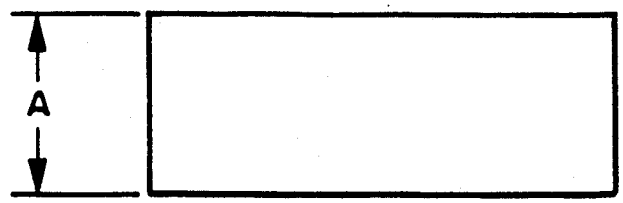
FIG. 6 is a plan view of an exemplary neckable material before tensioning and necking.
Figure 6A:
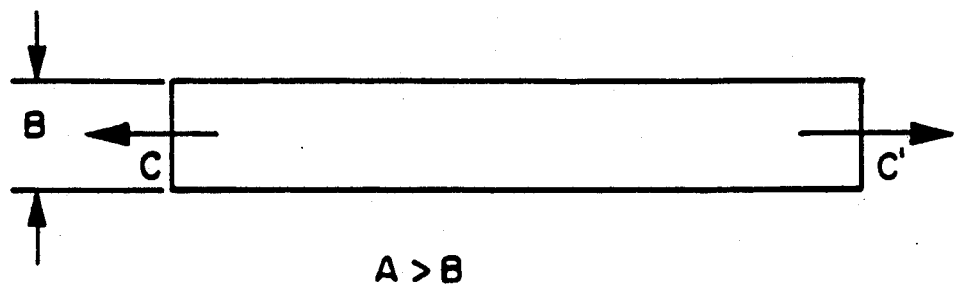
FIG. 6A is a plan view of an exemplary reversibly necked material.
Figure 6B:
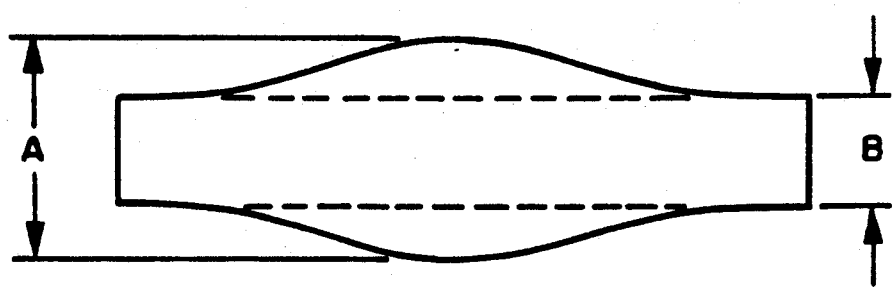
FIG. 6B is a plan view of an exemplary composite elastic material including a reversibly necked material while partially stretched.

For example, with reference to FIGS. 6, 6A, and 6B, if it is desired to prepare a composite elastic material including a reversibly necked material which is stretchable to a 150% elongation (i.e., stretched to a length that is about 250 percent of its initial relaxed length) in a direction generally parallel to the neckdown of the neckable material (e.g. cross-machine direction) and stretchable to a 100% elongation (i.e., stretched to a length that is about 200 percent of its initial relaxed length) in the perpendicular direction (e.g., machine direction), a width of neckable material shown schematically and not necessarily to scale in FIG. 6 having a width "A" such as, for example, 250 cm, is tensioned so that it necks down to a narrower width "B" of about 100 cm as shown in FIG. 6A. The tensioning forces are shown as arrows C and C' in FIG. 6A. The tensioned, necked material is heat treated while necked to impart a memory of its necked configuration shown in FIG. 6A. The resulting reversibly necked material is then joined in the necked configuration to an elastic sheet which is about the same width "B" as the tensioned, necked material and which is stretchable in the cross-machine direction at least to about the same width "A" as the original pre-necked dimensions of the necked material. For example, the elastic sheet may be approximately 100 cm and be stretchable to at least a width of 250 cm. The tensioned, necked material shown in FIG. 6A and the elastic sheet (not shown) are overlaid and joined at least at three spaced apart locations arranged in a non-linear configuration while the elastic sheet is maintained at a machine-direction elongation of about 120 percent (i.e., stretched about 220 percent of its initial relaxed machine-direction dimension) because, as previously noted, the necked material tends to prevent the elastic sheet from retracting fully to its original length in the machine direction.

The joined layers are allowed to relax causing puckers or gathers to form in the reversibly necked material between at least two of the bond locations. The resulting composite elastic material shown schematically and not necessarily to scale in FIG. 6B has a width "B" of about 100 cm and is stretchable to at least the original 250 cm width "A" of the neckable material for an elongation of about 150 percent (i.e., stretchable to about 250 percent of its initial necked width "B"). The composite elastic material is adapted to recover to its initial width "B" of about 100 cm because recovery of the elastic sheet to its initial width "B" assists the attached reversibly necked material in recovering to its necked width "B". Additionally, the composite elastic material is stretchable to about 100 percent in the machine direction which is the extent that the gathers or puckers in the reversibly necked material allow the elastic sheet to elongate in that direction. As can be seen from the example, the distance that the elastic sheet should be capable of stretching in the cross-machine direction before it is joined to the reversibly necked material needs only to be as great as the distance that the composite elastic material is desired to stretch in the cross-machine direction. However, as previously noted, the distance that the elastic sheet should be capable of stretching in the machine direction before it is joined to the reversibly necked material should be greater than the distance that the composite material is desired to stretch in the machine direction.

The gathers in the reversibly necked material may allow the composite elastic material to have stretch and recovery in a range of directions that are not substantially parallel to the machine direction, for example, in a direction that differs from the machine direction by about 45°. Similarly, the neckdown of the reversibly necked material may allow the composite elastic material to have stretch and recovery in a range of directions that are not substantially parallel to the direction of neckdown, for example, in a direction that differs from the direction of neckdown by about 45°. Because of the gathers in the reversibly necked material and the direction of neckdown may be aligned to allow stretch and recovery in generally perpendicular directions, and because the gathers and neckdown allow stretch and recovery in a range of directions, the composite elastic material may be adapted to have stretch and recovery in substantially all directions along the length and width of the material.

EXAMPLES 1-5

The composite elastic materials of examples 1-5 were made by joining an elastic sheet to at least one reversibly necked material. Tables 1, 3, 6, 8, and 10 provide Grab Tensile Test data for control samples and composite elastic necked-bonded material samples. The Grab Tensile Tests were performed on a constant rate of extension tester, Instron Model 1122 Universal Testing Instrument, using 4 inch by 6 inch samples. The jaw faces of the tester were 1 inch by 1 inch and the crosshead speed was set at 12 inches per minute. The following mechanical properties were determined for each sample: Peak Load, Peak Total Energy Absorbed and Percent Elongation.

The samples were also cycled on the Instron Model 1122 with Microcon II - 50 kg load cell and the results reported on Tables 2, 4, 5, 7, 9, and 11. The jaw faces of the tester were 3 inches wide by 1 inch high (i.e., in the direction to be tested) in this cycling test so the samples were cut to 3 inches by 7 inches (i.e., 7 inches in the direction to be tested) and weighed individually in grams. A 4 inch gauge length was used. Chart and crosshead speeds were set for 20 inches per minute and the unit was zeroed, balanced and calibrated according to the standard procedure. The maximum extension limit for the cycle length was set at a distance determined by calculating 56 percent of the "elongation to break" from the Grab Tensile Test. The samples were cycled to the specified cycle length four times and then were taken to break on the fifth cycle. The test equipment was set to measure Peak Load in pounds force, and Peak Energy Absorbed in inch pounds force per square inch for each cycle. On the fifth cycle (cycle to break), the Peak Elongation, Peak Load, and Peak Total Energy Absorbed were measured. The area used in the energy measurements (i.e., the surface area of material tested) is the gauge length (four inches) times the sample width (3 inches) which equals twelve square inches. The results of the Grab Tensile tests and cycle tests have been normalized for measured basis weight.

Peak Total Energy Absorbed (TEA) as used in the Examples and associated Tables is defined as the total energy under a stress versus strain (load versus elongation) curve up to the point of "peak" or maximum load. TEA is expressed in units of work/(length)$^2$ or (pounds force * inch)/(inches)$^2$. These values have been normalized by dividing by the basis weight of the sample in ounces per square yard (osy) which produces units of [(lbs$_f$* inch)/inch$^2$]/osy.

Peak Load as used in the Examples and associated Tables is defined as the maximum load or force encountered in elongating the sample to a specified elongation or to break. Peak Load is expressed in units of force (lbs$_f$) which have been normalized for the basis weight of the material resulting in a number expressed in units of lbs$_f$/(osy).

Elongation or Peak Elongation has the same general definition as previously set forth in the "Definition" section, and may be more specifically defined for the Examples and associated Tables as the relative increase in length of a specimen during the tensile test at Peak Load. Peak Elongation is expressed as a percentage, i.e., [(increase in length)/(original length)] × 100.

Permanent Set after a stretching cycle as used in the Examples and associated Tables is defined as a ratio of the increase in length of the sample after a cycle divided by the maximum stretch during cycling. Permanent Set is expressed as a percentage, i.e., [(final sample length − initial sample length)/(maximum stretch during cycling − initial sample length)] × 100. Permanent Set is related to recovery by the expression [permanent set = 100 − recovery] when recovery is expressed as a percentage.

In Tables 2, 4, 5, 7, 9, and 11, (which provide the results of the cycle testing), the value reported for the composite material's Permanent Set in the "Perm Set" row and in the column titled "To Break" is the value for Peak Elongation (i.e., peak elongation to break) measured during the fifth (final) stretch cycle. In those same Tables, the cycle test results reported in the "To Break" column for the elastomeric sheet are the values read from the Instron test equipment when the elastomeric sheet was elongated to the Peak Elongation (i.e., elongation at peak load when the sample was tested to break) measured during the fifth (final) stretch cycle for the composite elastic material which incorporated that particular elastomeric sheet.

EXAMPLE 1

Reversibly Necked Spunbonded Materials

Several neckable webs of conventionally produced spunbonded polypropylene having a basis weight of about 0.4 ounces per square yard (osy) were tested on an Instron Model 1122 Universal Testing Instrument. The average results for 4 samples are reported in Table 1 under the heading "Spunbond Control No. 1". The machine direction total energy absorbed is given in the column of Table 1 entitled "MD TEA". The machine direction peak load is given in the column entitled "MD Peak Load". The machine direction peak elongation is given in the column entitled "MD Peak Elong". The cross-machine direction total energy absorbed is given in the column entitled "CD TEA". The cross-machine direction peak load is given in the column entitled "CD Peak Load". The cross-machine direction peak elongation is given in the column entitled "CD Peak Elong".

One roll of above-described spunbond web having a basis weight of about 0.4 osy and a width of about 75 inches was unwound at a speed of about 146–147 feet/minute (fpm) and passed over a series of three steam can arrangements each containing 12 steam cans rotating at speeds of 161, 168 and 175 fpm respectively. The spunbond web was wound on a take-up roll at a speed of 178 fpm. The difference in speed between the unwind and the take-up rolls caused the material to neck to a final width of about 29–31 inches for a percent neckdown of about 61 to about 59 percent. The steam cans of the first two arrangements were kept at room temperature. The steam cans of the last arrangement were kept at a temperature of about 275° F. so that the spunbond web was heated while in the necked condition. Grab Tensile Testing was performed on the Instron Model 1122 Universal Testing Instrument and the results are reported in Table 1 under the heading "Reversibly Necked Spunbond No. 1A".

A different roll of the above-described Lurgi spunbond web having a basis weight of about 0.4 osy and a width of about 66 inches was unwound at a speed of about 142 (fpm) and passed over the series of three steam can arrangements each containing 12 steam cans rotating at speeds of 159, 168 and 172 fpm respectively. The spunbond web was wound on a take-up roll at a speed of 176 fpm. The difference in speed between the unwind and the take-up rolls caused the material to neck to a final width of about 26 inches for a percent neckdown of about 60 percent. The steam cans of the first two arrangements were kept at room temperature. The steam cans of the last arrangement were kept at a temperature of about 284° F. so that the spunbond web was heated while maintained in the stretched condition.

Grab Tensile Testing was performed on the Instron Model 1122 Universal Testing Instrument and the results are reported in Table 1 under the heading "Reversibly Necked Spunbond No. 1B".

Elastic Sheet

A blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi was formed into an elastic sheet of meltblown fibers utilizing conventional recessed die tip meltblowing process equipment. A four-bank meltblowing die arrangement was operated under the following conditions: die zone temperature from about 503 to about 548° F.; die polymer melt temperature from about 491 to about 532° F.; primary air temperature from about 544 to about 557 of pressure at die inlet/tip from about 85 to about 140 psig; forming vacuum about 2 inches of water; vertical forming distance about 11 inches, forming wire speed about 61 feet per minute and winder speed about 67 feet per minute. An elastic web of meltblown fibers was formed having a basis weight of about 125 grams per square meter (gsm) and a width of about 52 inches. The elastic meltblown was formed on a polypropylene film for ease of handling. The elastic sheet (minus the polypropylene film) was tested on the Instron Model 1122 Universal Testing Instrument and the results are given in Tables 1 and 2 under the heading "Elastomer Control No. 1." In Table 2, data collected in the last cycle (i.e. "To Laminate Break") for the Elastomer Control material was read at the cross-machine break elongation and the machine direction break elongation of NSBL No. 1 material shown at Table 1 as 217% and 83% respectively.

The 52 inch wide elastic web of meltblown fibers was pre-stretched utilizing a "22 inch Face Coating Line rewinder" made by the Black-Clawson Company. The unwind speed was set at about 30 fpm and the wind-up speed was set at about 63 fpm causing the material to neck or constrict. As the necked elastic material approached the wind-up roll, the material was slit to a width of about 30.5 inches. The slit pre-stretched sheet was tested on the Instron Model 1122 Universal Testing Instrument and the results are given in Table 1 under the heading "Prestretched Elastomer No. 1." From Table 1 it can be seen that stretching the elastomer had little affect on its physical properties.

Composite Elastic Material

The roll of "Reversibly Necked Spunbond No. 1A" was put on the top position of a three position roll unwind apparatus and the top unwind resistance brake was set at 66 pounds per square inch (psi). The roll of "Prestretched Elastomer No. 1." was placed on the middle position. The roll of "Reversibly Necked Spunbond No. 1B" was put on the bottom position of the three position roll unwind apparatus and the bottom unwind resistance brake was set at 85 psi. The bonder rolls operated at a speed of about 30 feet/minute and the elastic sheet unwind roll operated at an speed of about 28 feet/minute.

Figure 7:
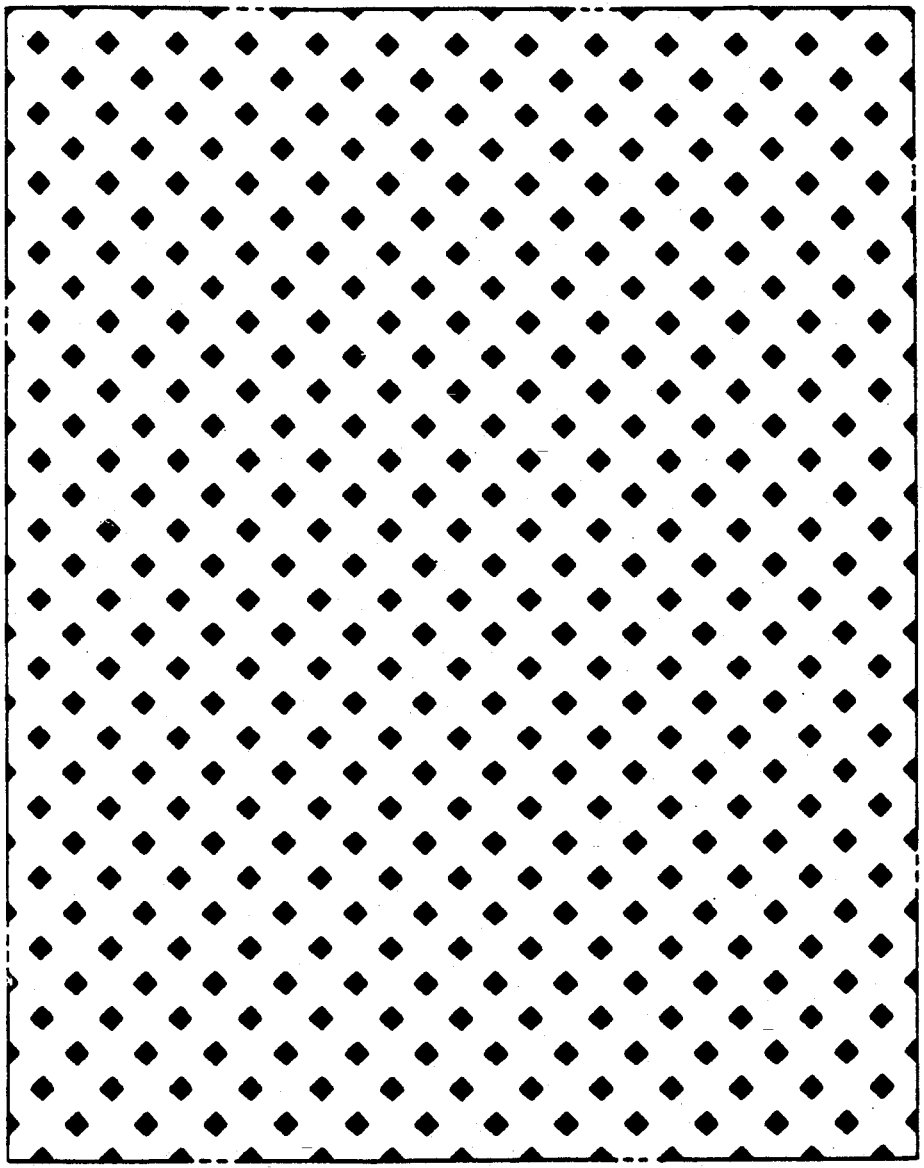
FIG. 7 is a representation of an exemplary bonding pattern used to join components of a composite elastic material.

The necked spunbonded material and the elastic meltblown sheet were joined utilizing a heated bonder roller arrangement. The temperature of the calendar roller and anvil roller was set at 127° F. and the nip pressure was 20 pounds per square inch (psi) which was equivalent to about 355 pounds per linear inch (pli). FIG. 7 shows the pattern of the engraved calendar roller enlarged about 5 times. The bond pattern of the engraved roller had approximately 300 pins or bond points per square inch which produced a bond area of about 15 percent. The lines connecting the pins or bond points are drawing lines and are not present in the engraving pattern of the calender roller. The composite material was allowed to relax immediately after bonding.

The multi-direction stretch composite elastic material produced in this manner was tested on the Instron Model 1122 Universal Testing Instrument and the results are given in Tables 1 and 2 under the heading "NSBL No. 1". Compared to the neckable "Spunbond Control No. 1", all Grab Tensile Test results were lower for the "NSBL No. 1" except for the machine direction elongation and the cross-machine direction elongation which were significantly increased. Compared to the reversibly necked spunbonded control material (Reversibly Necked Spunbond Control Nos. 1A and 1B), all Grab Tensile Test results were lower for the composite elastic material except for the machine direction elongation and the cross-machine direction elongation which were significantly increased. Compared to the elastic meltblown sheet, the composite elastic material has about the same values during cycling but has higher Total Energy Absorbed and Peak Load at the breaking point of the composite elastic material (Table 2).

COMPARATIVE EXAMPLE 1A

A composite elastic material was prepared utilizing the same materials as Example 1 except that the elastic sheet had a basis weight of 75 grams and was not pre-stretched before it was bonded to the reversibly necked spunbonded polypropylene.

The reversibly necked spunbonded polypropylene webs and the meltblown elastic sheet were joined utilizing a heated bonder roller arrangement at the same temperature and pressure and using the same bond pattern as in Example 1. No braking force was applied to any of the unwind rolls except to provide enough tension to maintain control of the materials. Thus, the reversibly necked spunbond material remained at about its necked width and the elastic sheet remained unstretched.

The resulting composite elastic material was tested on the Instron Model 1122 Universal Testing Instrument and the results are given in Tables 1 and 2 under the heading "Composite No. 1". When compared to NSBL No. 1, the properties of Composite No. 1 were not changed much except that the cross-machine direction elongation was greater for Composite No. 1and the machine direction elongation was greater for NSBL No. 1.

EXAMPLE 2

A roll of "Reversibly Necked Spunbond No. 1A" from Example 1 having a basis weight of 0.4 osy was put on the top position of a three position roll unwind apparatus. A roll of the pre-stretched elastic meltblown sheet of Example 1 having a basis weight of 125 gsm (Prestretched Elastomer No. 1) was placed on the middle position. A roll of "Reversibly Necked Spunbond No. 1B", also from Example 1, was put on the bottom position of the three position roll unwind apparatus. The bonder rolls operated at a speed of about 31 feet/- minute and the elastic sheet unwind roll operated at a speed of about 20 feet/minute to further elongate the elastic sheet. The reversibly necked spunbonded polypropylene webs and the meltblown elastic sheet were joined utilizing a heated bonder roller arrangement at the same temperature and pressure and using the same bond pattern as in Example 1. The Grab Tensile test properties of the material were measured utilizing an Instron Model 1122 Universal Testing Instrument and the results are reported in Tables 3, 4 and 5 under the heading "NSBL No. 2A".

COMPARATIVE EXAMPLE 2

A composite elastic material was prepared using the same material and procedures of Example 2 except that the bonder rolls operated at a speed of about 31 feet/minute and the elastic sheet unwind roll operated at a speed of about 10 feet/minute to further elongate the elastic sheet The reversibly necked spunbonded polypropylene webs and the meltblown elastic sheet were joined utilizing a heated bonder roller arrangement at the same temperature and pressure and using the same bond pattern as in Example 2. The Grab Tensile test properties of the material were measured utilizing an Instron Model 1122 Universal Testing Instrument and the results are reported in Tables 3, 4 and 5 under the heading "NSBL No. 2B". Comparing NSBL No. 2A to NSBL No. 2B shows that the peak TEA of NSBL 2A is greater because that material is cycled to a longer length. The increase in peak TEA can also be seen for the Elastomer Control No. 1when cycled in the machine direction to 46%, 84% and 167%. It can be seen from Tables 4 and 5 that NSBL Nos. 2A and 2B have higher total energy and peak load during the final cycle because of the "permanent stop" (i.e., limit on the ability elastic sheet to stretch) caused by the spunbond layers of the composite.

EXAMPLE 3

A composite elastic material was prepared using the same materials and procedures of Example 1 except that the elastic meltblown sheet was pre-stretched at an unwind speed of 30 fpm and wind-up speed of 88 fpm for a draw ratio of about 2.9. The bonder rolls operated at a speed of about 30 feet/minute and the elastic sheet unwind roll operated at a speed of about 20 feet/minute to further elongate the elastic material. The reversibly necked spunbonded polypropylene webs and the prestretched meltblown elastic sheet were joined utilizing smooth bonding rolls to provide maximum bond surface area. The temperature of the bonder rolls was 90° F. and the calendar pressure was 20 psi (equivalent to about 355 pli). The Grab Tensile test properties of the material were measured utilizing an Instron Model 1122 Universal Testing Instrument and the results are reported in Tables 6 and 7 under the heading "NSBL No. 3A".

COMPARATIVE EXAMPLE 3

A composite elastic material was prepared using the same materials and procedures of Example 3 including the elastic meltblown sheet that was pre-stretched at an unwind speed of 30 fpm and wind-up speed of 88 fpm. The bonder rolls operated at a speed of about 30 feet/minute and the elastic sheet unwind roll also operated at a speed of about 30 feet/minute so there was no additional stretching of the elastic sheet. As in Example 3, the reversibly necked spunbonded polypropylene webs and the prestretched meltblown elastic sheet were joined utilizing smooth bonding rolls to provide a large bond surface area. The temperature of the bonder rolls was 90° F. and the calendar pressure was 20 psi (equivalent to about 355 pli). The Grab Tensile test properties of the material were measured utilizing an Instron Model 1122 Universal Testing Instrument and the results are reported in Tables 6 and 7 under the heading "NSBL No. 3B". As can be seem from Tables 6 and 7, the cross-machine direction stretch properties are affected very little by the amount that the elastic sheet is stretched in the machine direction.

EXAMPLE 4

A composite elastic material was prepared using the same materials and procedures of Example 1. The bonder rolls operated at a speed of about 35 feet/minute and the elastic sheet unwind roll operated at a speed of about 17 feet/minute to further elongate the elastic material. The reversibly necked spunbonded polypropylene webs and the prestretched meltblown elastic sheet were joined utilizing smooth bonding rolls to provide maximum bond surface area. The temperature of the bonder rolls was 90° F. and the calendar pressure was 60 psi. The Grab Tensile test properties of the material were measured utilizing an Instron Model 1122 Universal Testing Instrument and the results are reported in Tables 8 and 9 under the heading "NSBL No. 4A".

COMPARATIVE EXAMPLE 4

A composite elastic material was prepared using the same materials and procedures of Example 1. The bonder rolls operated at a speed of about 35 feet/minute and the elastic sheet unwind roll also operated at a speed of about 35 feet/minute so there would be no additional stretching of the elastic material. The reversibly necked spunbonded polypropylene webs and the prestretched meltblown elastic sheet were joined utilizing smooth bonding rolls to provide the maximum bonding area. The temperature of the bonder rolls was 90° F. and the calendar pressure was 60 psi. The Grab Tensile test properties of the material were measured utilizing an Instron Model 1122 Universal Testing Instrument and the results are reported in Tables 8 and 9 under the heating "NSBL No. 4B". As can be seen from Tables 8 and 9, the use of smooth bonding rolls instead of a diamond pattern calendar had little effect on the tensile properties of the resulting composite elastic materials.

EXAMPLE 5

A composite elastic material was prepared using the same materials and procedures of Example 2. The heated bonder roller temperature was 90° F. The bonder rolls operated at a speed of about 31 feet/minute and the elastic sheet unwind roll operated at a speed of about 20 feet/minute to further elongate the elastic material before being joined to the reversibly necked webs. The reversibly necked spunbonded polypropylene webs and the prestretched meltblown elastic sheet were joined utilizing the diamond pattern roller described in Example 1. The calendar pressure was 20 psi (equivalent to about 355 pli). The Grab Tensile test properties of the material were measured utilizing an Instron Model 1122 Universal Testing Instrument and the results are reported in Tables 10 and 11 under the heading "NSBL No. 2A".

COMPARATIVE EXAMPLE 5

A composite elastic material was prepared using the same materials and procedures of Example 3. Smooth bonder rollers were used to provide maximum bond surface area. The bonder rolls operated at a speed of about 30 feet/minute and the elastic sheet unwind roll operated at a speed of about 20 feet/minute to further elongate the elastic material before being joined to the reversibly necked webs. The temperature of the smooth bonder rolls was 90° F. and the calendar pressure was 20 psi (equivalent to about 355 pli). The Grab Tensile test properties of the material were measured utilizing an Instron Model 1122 Universal Testing Instrument and the results are reported in Tables 10 and 11 under the heading "NSBL No. 3A". As can be seen from Tables 10 and 11, the use of smooth bonder rollers instead of the diamond pattern calendar roller had little effect on the Grab Tensile test properties. However, the use of smooth bonder rolls resulted in lower values of Peak TEA and Peak Load during the cross-machine direction cycle testing. Those materials also had higher values for permanent set during cross-machine direction cycling than for the diamond pattern roll bonded materials.

TABLE 1

| Grab Tensiles: | Reversibly Necked Spunbond No. 1 A | Reversibly Necked Spunbond No. 1 B | NSBL No. 1 | Elastomer Control No. 1 | Composite No. 1 | Prestretched Elastomer No. 1 | Spunbond Control No. 1 |
| --- | --- | --- | --- | --- | --- | --- | --- |
| MD TEA | .32 ± .15 | .25 ± .07 | .21 ± .04 | 1.53 ± .25 | .14 ± .03 | 1.25 ± .27 | .98 ± .2 |
| MD Peak Load | 9.8 ± .8 | 8.2 ± 1.2 | 3.4 ± .4 | 1.75 ± .18 | 5.0 ± .06 | 1.41 ± .16 | 15.1 ± 1 |
| MD Peak Elong | 19 ± 6 | 18 ± 2 | 83 ± 5 | 550 ± 50 | 25 ± 2 | 550 ± 80 | 40 ± 6 |
| CD TEA | .55 ± .22 | .52 ± .10 | .63 ± .14 | 1.44 ± .18 | .52 ± .04 | 1.35 ± .27 | .95 ± .2 |
| CD Peak Load | 5.0 ± .6 | 4.2 ± .7 | 2.6 ± .14 | 1.58 ± .08 | 2.3 ± .2 | 1.41 ± .13 | 14 ± 1 |
| CD Peak Elong | 172 ± 20 | 188 ± 14 | 217 ± 30 | 560 ± 60 | 228 ± 13 | 623 ± 70 | 50 ± 5 |

TABLE 2

| CYCLE: | 1 | 2 | 3 | 4 | To Break |
| --- | --- | --- | --- | --- | --- |
| Composite No. 1 Cycled in the cross-machine direction ot 128% Elongation | | | | | |
| Peak TEA | .148 ± .01 | .077 ± .005 | .07 ± .005 | .07 ± .005 | .519 ± .06 |
| Peak Load | .69 ± .06 | .61 ± .05 | .58 ± .05 | .57 ± .05 | 2.04 ± .08 |
| Perm Set | 10.5 | 12 | 13 | 14 | 227 ± 14 |
| NSBL No. 1 Cycled in the cross-machine direction to 121% Elongation | | | | | |
| Peak TEA | .199 ± .014 | .096 ± .005 | .087 ± .003 | .082 ± .004 | .483 ± .044 |
| Peak Load | 1.27 ± .16 | 1.13 ± .15 | 1.04 ± .13 | 1.04 ± .13 | 2.46 ± .14 |
| Perm Set | 12 ± 1 | 14 ± .5 | 14 ± .5 | 16 ± 1 | 184 ± 10 |
| Elastomer Control No. 1 Cycled in the cross-machine direction to 121% Elongation | | | | | |
| Peak TEA | .17 ± .004 | .115 ± .002 | .11 ± .001 | .104 ± .003 | .24 ± .003 |
| Peak Load | .62 ± .01 | .58 ± .01 | .57 ± .01 | .56 ± .003 | .725 ± .003 |
| Perm Set | | | | | |
| NSBL No. 1 Cycled in the cross-machine direction to 121% Elongation | | | | | |
| Peak TEA | .199 ± .014 | .096 ± .005 | .087 ± .003 | .082 ± .004 | .483 ± .044 |
| Peak Load | 1.27 ± .16 | 1.13 ± .15 | 1.1 ± .13 | 1.04 ± .13 | 2.46 ± .14 |
| Perm Set | 12 ± 1 | 14 ± .5 | 14 ± .5 | 16 ± 1 | 184 ± 10 |
| Elastomer Control No. 1, Cycled in the machine direction to 46% Elongation | | | | | |
| Peak TEA | 0.42 ± .002 | .034 ± .002 | .033 ± .002 | .032 .002 | .111 ± .003 |
| Peak Load | .448 ± .01 | .43 ± .01 | .42 ± .01 | .42 ± .01 | .662 ± .013 |
| Perm Set | — | — | — | — | — |
| NSBL No. 1 Cycled in the machine direction to 46% Elongation | | | | | |
| Peak TEA | .029 ± .005 | .022 ± .003 | .021 ± .003 | .020 ± .003 | .541 ± .11 |
| Peak Load | .383 ± .09 | .355 ± .08 | .341 ± .07 | .341 ± .07 | 6.88 ± 1.43 |
| Perm Set | 6.6 ± .1 | 8 ± .6 | 9.3 ± .9 | 12.6 ± .6 | 90 ± 4 |

TABLE 3

| Grab Tensiles: | Elastomer Control No. 1 | NSBL No. 1 | NSBL No. 2A | NSBL No. 2B |
| --- | --- | --- | --- | --- |
| MD TEA | 1.53 ± .25 | .21 ± .04 | .28 ± .05 | .50 ± .04 |
| MD Peak Load | 1.75 ± .18 | 3.4 ± .4 | 2.82 ± .37 | 2.26 ± .2 |
| MD Elong | 549 ± 50 | 83 ± 5 | 150 ± 10 | 297 ± 6 |
| CD TEA | 1.44 ± .18 | .63 ± .14 | .45 ± 11 | .40 ± .05 |
| CD Peak Load | 1.58 ± .08 | 2.6 ± .14 | 2.52 ± .16 | 2.51 ± .21 |
| CD Elong | 560 ± 60 | 217 ± 30 | 177 ± 21 | 164 ± 11 |

TABLE 4

| CYCLE: | 1 | 2 | 3 | 4 | To Break |
| --- | --- | --- | --- | --- | --- |
| Elastomer Control No. 1 Cycled in the machine direction ot 46% Elongation | | | | | |
| Peak TEA | 0.42 ± .002 | .034 ± .002 | .033 ± .022 | .032 ± .002 | .111 ± .003 |
| Peak Load | .448 ± .01 | .43 ± .01 | .42 ± .01 | .42 ± .01 | .662 ± .013 |
| Perm Set | — | — | — | — | — |
| NSBL No. 1 Cycled in the machine direction to 46% Elongation | | | | | |
| Peak TEA | .o29 ± .005 | .022 ± .003 | .021 ± .003 | .020 ± .003 | .541 ± .11 |
| Peak Load | .383 ± .09 | .355 ± .08 | .341 ± .07 | .341 ± .07 | 6.88 ± 1.43 |
| Perm Set | 6.6 ± .1 | 8 ± .6 | 9.3 ± .9 | 12.6 ± .6 | 90 ± 4 |
| Elastomer Control No. 1 Cycled in the machine direction to 84% Elongation | | | | | |
| Peak TEA | .099 ± .001 | .076 ± .001 | .073 ± .001 | .071 ± .001 | .227 ± .003 |
| Peak Load | .615 ± .008 | .580 ± .006 | .569 ± .007 | .561 ± .006 | .786 ± .008 |
| Perm Set | — | — | — | — | |

TABLE 4-continued

| CYCLE: | 1 | 2 | 3 | 4 | To Break |
|---|---|---|---|---|---|
| NSBL No. 2A Cycled in the machine direction to 84% Elongation | | | | | |
| Peak TEA | .053 ± .003 | .039 ± .002 | .037 ± .002 | .036 ± .002 | .526 ± .10 |
| Peak Load | .383 ± .03 | .34 ± .025 | .344 ± .025 | .33 ± .02 | 4.83 ± .6 |
| Perm Set | 6 ± .6 | 7.5 ± .5 | 8.3 ± .3 | 11.2 ± .7 | 148 ± 9 |
| Elastomer Control No. 1 Cycled in the machine direction to 167% Elongation | | | | | |
| Peak TEA | .312 ± .003 | .201 ± .003 | .19 ± .003 | .184 ± .003 | .66 ± .01 |
| Peak Load | .84 ± .014 | .78 ± .014 | .76 ± .015 | .75 ± .01 | 1.1 ± .02 |
| Perm Set | — | — | — | — | — |
| NSBL No. 2B Cycled in the machine direction to 167% Elongation | | | | | |
| Peak TEA | .166 ± .007 | .117 ± .005 | .111 ± .004 | .107 ± .004 | .891 ± .153 |
| Peak Load | .485 ± .02 | .455 ± .02 | .44 ± .02 | .436 ± .02 | 3.88 ± .46 |
| Perm Set | 6.5 ± .2 | 7.7 ± .5 | 8.4 ± .3 | 9.6 ± .5 | 318 ± 15 |

TABLE 5

| CYCLE: | 1 | 2 | 3 | 4 | To Break |
|---|---|---|---|---|---|
| Elastomer Control No. 1 Cycled in the cross-machine direction ot 122% Elongation | | | | | |
| Peak TEA | .17 ± .004 | .115 ± .002 | .11 ± .001 | .104 ± .003 | .24 ± .003 |
| Peak Load | .62 ± .01 | .58 ± .006 | .57 ± .004 | .56 ± .003 | .725 ± .003 |
| Perm Set | — | | | | |
| NSBL No. 2B Cycled in the cross-machine direction to 122% Elongation | | | | | |
| Peak TEA | .199 ± .01 | .096 ± .005 | .09 ± .003 | .082 ± .004 | .483 ± .04 |
| Peak Load | 1.27 ± .16 | 1.13 ± .15 | 1.08 ± .13 | 1.04 ± .13 | 2.46 ± .14 |
| Perm Set | 12 ± 1 | 14 ± .5 | 14 ± .3 | 16 ± 1 | 184 ± 9 |
| Elastomeric Control No. 1 Cycled in the cross-machine direction to 100% Elongation | | | | | |
| Peak TEA | .132 ± .002 | .09 ± .001 | .09 ± .002 | .085 ± .001 | .211 ± .004 |
| Peak Load | .575 ± .012 | .54 ± .01 | .53 ± .01 | .52 ± .01 | .86 ± .01 |
| Perm Set | | | | | |
| NSBL No. 2A Cycled in the cross-machine direction to 100% Elongation | | | | | |
| Peak TEA | .145 ± .03 | .075 ± .003 | .068 ± .02 | .064 ± .002 | .462 ± .05 |
| Peak Load | 1.31 ± .28 | 1.06 ± .05 | 1.0 ± .04 | .96 ± .04 | .257 ± .14 |
| Perm Set | 14 ± .3 | 16 ± .5 | 17 ± .8 | 18 ± 1.5 | 165 ± 7 |
| Elastomer Control No. 1 Cycled in the cross-machine direction to 92% Elongation | | | | | |
| Peak TEA | .111 ± .005 | .08 ± .002 | .076 ± .002 | .072 ± .001 | .214 ± .002 |
| Peak Load | .549 ± .01 | .52 ± .01 | .508 ± .01 | .50 ± .01 | .69 ± .01 |
| Perm Set | — | — | — | — | — |
| NSBL No. 2B Cycled in the cross-machine direction to 92% Elongation | | | | | |
| Peak TEA | .136 ± .002 | .060 ± .001 | .053 ± .001 | .050 ± .002 | .644 ± .125 |
| Peak Load | 1.28 ± .02 | 1.12 ± .02 | 1.06 ± .02 | 1.02 ± .03 | 3.52 ± .2 |
| Perm Set | | | | | 163 ± 12 |

TABLE 6

| Grab Tensiles: | Prestretched Elastomer Control No. 1 | NSBL No. 3A | NSBL No. 3B |
|---|---|---|---|
| MD TEA | .80 ± .26 | .36 ± .04 | .23 ± .03 |
| MD Peak Load | 1.38 ± .19 | 3.7 ± .42 | 3.9 ± .2 |
| MD Elong | 354 ± 70 | 138 ± 15 | 72 ± 6 |
| CD TEA | .93 ± .23 | .42 ± .1 | .58 ± .12 |
| CD Peak Load | 1.32 ± .13 | 3.3 ± .5 | 2.53 ± .20 |
| CD Elong | 450 ± 70 | 150 ± 23 | 194 ± 28 |

TABLE 7

| CYCLE: | 1 | 2 | 3 | 4 | To Break |
|---|---|---|---|---|---|
| NSBL No. 3A Cycled in the machine direction to 78% elongation | | | | | |
| Peak TEA | .073 ± .004 | .059 ± .003 | .052 ± .003 | .050 ± .003 | .67 ± .07 |
| Peak Load | .583 ± .04 | .51 ± .04 | .50 ± .04 | .49 ± .04 | 5.83 ± .52 |
| Perm Set | 7 ± 1 | 9 ± 1 | 9 ± 1 | 11 ± 1 | 145 ± 8 |
| NSBL No. 3B Cycled in the machine direction to 40% elongation | | | | | |
| Peak TEA | .038 ± .01 | .026 ± .004 | .025 ± .003 | .024 ± .003 | .413 ± .03 |
| Peak Load | .94 ± .46 | .79 ± .33 | .77 ± .32 | .75 ± .32 | 7 ± .7 |
| Perm Set | 8 ± 2 | 9 ± 2 | 10 ± 2 | 13 ± 2 | 70 ± 4 |
| NSBL No. 3B Cycled in the cross-machine direction to 73% elongation | | | | | |
| Peak TEA | .088 ± .007 | .051 ± .018 | .04 ± .003 | .04 ± .003 | .571 ± .04 |
| Peak Load | .65 ± .06 | .57 ± .05 | .54 ± .04 | .53 ± .05 | 2.38 ± .2 |
| Perm Set | 14 ± 1 | 16 ± 1 | 17 ± 1 | 18 ± 1 | 180 ± 8 |
| NSBL No. 3A Cycled in the cross-machine direction to 84% elongation | | | | | |
| Peak TEA | .071 ± .06 | .034 ± .02 | .03 ± .015 | .03 ± .014 | .53 ± .09 |
| Peak Load | .66 ± .4 | .58 ± .4 | .56 ± .3 | .54 ± .3 | 4.97 ± 1.4 |
| Perm Set | 21 ± .5 | 23 ± .8 | 25 ± .8 | 27 ± .8 | 161 ± 9 |

TABLE 8

| Grab Tensiles: | Avg. of Reversibly Necked Spunbond Nos. 1 & 2 | Elastomer Control No. 1 | NSBL No. 4A | NSBL No. 4B | Prestretched Elastomer No. 1 | Control No. 1 |
| --- | --- | --- | --- | --- | --- | --- |
| MD TEA | .28 ± .1 | 1.53 ± .25 | .28 ± .07 | .19 ± .03 | 1.25 ± .27 | .98 ± .2 |
| MD Peak Load | 9 ± 1 | 1.75 ± .18 | 3.4 ± .3 | 4.66 ± .61 | 1.41 ± .16 | 15.1 ± 1 |
| MD Elong | 18 ± 4 | 550 ± 50 | 110 ± 20 | 32 ± 7 | 550 ± 80 | 40 ± 6 |
| CD TEA | .53 ± .15 | 1.44 ± .18 | .55 ± .14 | .65 ± .10 | 1.36 ± .27 | .95 ± .2 |
| CD Peak Load | 4.6 ± .6 | 1.58 ± .8 | 2.63 ± .20 | 2.55 ± .06 | 1.41 ± .13 | 14 ± 1 |
| CD Elong | 180 ± 17 | 560 ± 60 | 190 ± 30 | 230 ± 20 | 623 ± 70 | 50 ± 5 |

TABLE 9

| CYCLE: | 1 | 2 | 3 | 4 | To Break |
| --- | --- | --- | --- | --- | --- |
| NSBL No. 4A Cycled in the machine direction to 60% elongation | | | | | |
| Peak TEA | .052 ± .004 | .039 ± .002 | .037 ± .002 | .036 ± .002 | .466 ± .132 |
| Peak Load | .53 ± .10 | .50 ± .08 | .48 ± .08 | .48 ± .08 | 5.16 ± .7 |
| Perm Set | 6 ± 1 | 7 ± 1 | 8 ± 1 | 10 ± 1 | 112 ± 10 |
| NSBL No. 4A Cycled in the machine direction to 107% elongation | | | | | |
| Peak TEA | .18 ± .01 | .07 ± .002 | .065 ± .002 | .061 ± .002 | .43 ± .04 |
| Peak Load | 1.21 ± .08 | 1.05 ± .07 | 1.0 ± .07 | .96 ± .07 | 2.96 ± .194 |
| Perm Set | 20 ± 1 | 23 ± 1 | 24 ± 1 | 27 ± 3 | 166 ± 5 |
| NSBL No. 4B Cycled in the cross-machine direction to 128% elongation | | | | | |
| Peak TEA | .21 ± .02 | .10 ± .01 | .09 ± .01 | .08 ± .01 | .49 ± .05 |
| Peak Load | 1.12 ± .2 | 1.0 ± .2 | .94 ± .17 | .91 ± .17 | 2.1 ± .22 |
| Perm Set | 13 ± 1 | 15 ± 1 | 16 ± 1 | 17 ± 1 | 203 ± 14 |

TABLE 10

|  | NSBL No. 2A | NSBL No. 3A |
| --- | --- | --- |
| MD TEA | .28 ± .05 | .36 ± .04 |
| MD Peak Load | 2.82 ± .37 | 3.7 ± .42 |
| MD Elong | 150 ± 10 | 138 ± 15 |
| CD TEA | .45 ± .11 | .42 ± .10 |
| CD Peak Load | 2.52 ± .16 | 3.3 ± .5 |
| CD Elong | 177 ± 21 | 150 ± 23 |

TABLE 11

| CYCLE: | 1 | 2 | 3 | 4 | To Break |
| --- | --- | --- | --- | --- | --- |
| NSBL No. 2A Cycled in the machine direction to 84% elongation | | | | | |
| Peak TEA | .07 ± .004 | .052 ± .003 | .050 ± .003 | .049 ± .003 | .68 ± .10 |
| Peak Load | .425 ± .02 | .40 ± .02 | .39 ± .02 | .385 ± .02 | 5.37 ± .26 |
| Perm Set | 6 ± 1 | 7 ± 1 | 8 ± 1 | 10 ± 1 | 165 ± 7 |
| NSBL No. 3A Cycled in the machine direction to 77% elongation | | | | | |
| Peak TEA | .07 ± .009 | .054 ± .003 | .052 ± .003 | .05 ± .003 | .67 ± .07 |
| Peak Load | .54 ± .04 | .51 ± .04 | .50 ± .03 | .49 ± .04 | 5.83 ± .5 |
| Perm Set | 7 ± 1 | 9 ± 1 | 9 ± 1 | 1 ± 1 | 145 ± 8 |
| NSBL No. 2A Cycled in the cross-machine direction to 10% elongation | | | | | |
| Peak TEA | .16 ± .03 | .077 ± .01 | .07 ± .01 | .066 ± .01 | .528 ± .05 |
| Peak Load | 1.26 ± .3 | 1.1 ± .3 | 1.05 ± .25 | 1.02 ± .25 | 2.9 ± .2 |
| Perm Set | — | — | — | — | 165 ± 11 |
| NSBL No. 3A Cycled in the cross-machine direction to 83% elongation | | | | | |
| Peak TEA | .07 ± .06 | .03 ± .02 | .03 ± .02 | .03 ± .01 | .534 ± .1 |
| Peak Load | .66 ± .45 | .58 ± .4 | .56 ± .35 | .54 ± .33 | 5.0 ± 1.5 |
| Perm Set | 21 ± .5 | 23 ± 1 | 25 ± 1 | 27 ± 1 | 161 ± 10 |

RELATED APPLICATIONS

This application is one of a group of commonly assigned patent applications which are being filed on the same date. The group includes the present application and application Ser. No. 07/451,264 entitled "Multi-Direction Stretch Composite Elastic Material" in the name of Michael T. Morman. The subject matter of these applications is hereby incorporated herein by reference.

Disclosure of the presently preferred embodiment of the invention is intended to illustrate and not to limit the invention. It is understood that those of skill in the art should be capable of making numerous modifications without departing from the true spirit and scope of the invention.

What is claimed is:

1. A composite elastic material capable of stretching in at least two directions comprising:
   at least one elastic sheet; and
   at least one reversibly necked material joined to the elastic sheet at least at least at three locations arranged in a nonlinear configuration, the reversibly necked material being gathered between at least two of the locations.

2. The material of claim 1 wherein the reversibly necked material is a material selected from the group consisting of knitted fabrics, loosely woven fabrics, and nonwoven materials.

3. The material of claim 1 wherein the nonwoven material is a web selected from the group consisting of a bonded carded web of fibers, a web of spunbonded fibers, a web of meltblown fibers, and a multilayer material including at least one of the webs.

4. The material of claim 3 wherein the web of meltblown fibers includes microfibers.

5. The material of claim 3 wherein the fibers comprise a polymer selected from the group consisting of polyolefins, polyesters, and polyamides.

6. The material of claim 5 wherein the polyolefin is selected from the group consisting of one or more of polyethylene, polypropylene, polybutylene, polyethylene copolymers, polypropylene copolymers, and polybutylene copolymers.

7. The material of claim 1 wherein the necked material is a composite material comprising a mixture of fibers and one or more other materials selected from the group consisting of wood pulp, staple fibers, particulates and superabsorbent materials.

8. The material of claim 1 wherein the elastic sheet comprises an elastomeric polymer selected from the group consisting of elastic polyesters, elastic polyurethanes, elastic polyamides, copolymers of ethylene and at least one vinyl monomer, and elastic A-B-A' block copolymers wherein A and A' are the same or different thermoplastic polymer, and wherein B is an elastomeric polymer block.

9. The material of claim 8 wherein the elastomeric polymer is blended with a processing aid.

10. The material of claim 1 wherein the elastic sheet is an elastic web of meltblown fibers.

11. The material of claim 10 wherein the web of meltblown fibers includes microfibers.

12. The material of claim 1 wherein the elastic sheet is a pressure sensitive elastomeric adhesive sheet.

13. The material of claim 12 wherein the pressure sensitive elastomeric adhesive sheet is formed from a blend of an elastomeric polymer and a tackifying resin.

14. The material of claim 13 wherein the blend further includes a processing aid.

15. The material of claim 12 wherein the pressure sensitive elastomer adhesive sheet is a pressure sensitive elastomer adhesive web of meltblown fibers.

16. The material of claim 15 wherein the web of meltblown fibers include microfibers.

17. A composite elastic material capable of stretching in at least two directions comprising:
at least one elastic web of meltblown fibers; and
at least one reversibly necked nonwoven web of polypropylene fibers joined to the elastic web at least at three locations arranged in a nonlinear configuration, the reversibly necked nonwoven web being gathered between at least two of the locations.

18. The material of claim 17 wherein the necked nonwoven web of polypropylene fibers is selected from the group consisting of a bonded carded web of polypropylene fibers, a web of spunbond polypropylene fibers, a web of meltblown polypropylene fibers, a hydraulically entangled web of polypropylene fibers, and a multilayer material including at least one of the webs.

19. The material of claim 18 wherein the web of meltblown fibers includes microfibers.

20. The material of claim 17 wherein the necked nonwoven web of polypropylene fibers is a composite web comprising a mixture of polypropylene fibers and one or more other materials selected from the group consisting of wood pulp, staple fibers, particulates and superabsorbent materials.

21. The material of claim 17 wherein the elastic sheet comprises an elastomeric polymer selected from the group consisting of elastic polyesters, elastic polyurethanes, elastic polyamides, copolymers of ethylene and at least one vinyl monomer, and elastic A-B-A' block copolymers wherein A and A' are the same or different thermoplastic polymer, and wherein B is an elastomeric polymer block.

22. The material of claim 21 wherein the elastomeric polymer is blended with a processing aid.

23. The material of claim 17 wherein the elastic web of meltblown fibers is a pressure sensitive elastomeric adhesive web of meltblown fibers.

24. The material of claim 23 wherein the pressure sensitive elastomer adhesive web of meltblown fibers is formed from a blend of an elastomeric polymer and a tackifying resin.

25. The material of claim 24 wherein the blend further includes a processing aid.

26. The material of claim 25 wherein the web of meltblown fibers includes microfibers.

* * * * *

UNITED STATES PATENT AND TRADEMARK OFFICE
CERTIFICATE OF CORRECTION

PATENT NO. : 5,114,781
DATED : May 19, 1992
INVENTOR(S) : Michael T. Morman

It is certified that error appears in the above-identified patent and that said Letters Patent is hereby corrected as shown below:

Page 11, line 7, "loose" should read --lose--;

See Amendment, Page 27, line 6, "557 of pressure" should read --557°F.; pressure--;

Page 28, line 7, "an" should read --a--;

Page 30, line 9, "sheet The" should read --sheet. The--;

Page 31, line 22, "seem" should read --seen--;

Page 32, line 17, "heating" should read --heading--;

Page 34, line 3, Table 22, "ot 128%" should read --to 128%--;

Page 36, line 3, Table 4, "ot 46%" should read --to 46%--;

Page 37, line 3, Table 5, "ot 122%" should read --to 122%--;

Page 40, line 11, Table 11, "to 10%" should read --to 100%--.

UNITED STATES PATENT AND TRADEMARK OFFICE
CERTIFICATE OF CORRECTION

PATENT NO. : 5,114,781

DATED : May 19, 1992

INVENTOR(S) : Michael T. Morman

It is certified that error appears in the above-identified patent and that said Letters Patent is hereby corrected as shown below:

Page 42, line 8, "at least at least" should read --at least--.

Signed and Sealed this

Twenty-first Day of September, 1993

BRUCE LEHMAN

Attest:

Attesting Officer

Commissioner of Patents and Trademarks